United States Patent [19]

Sato et al.

[11] Patent Number: 4,628,450
[45] Date of Patent: Dec. 9, 1986

[54] DATA PROCESSING SYSTEM HAVING A LOCAL MEMORY WHICH DOES NOT USE A DIRECTORY DEVICE WITH DISTRIBUTED RESIDENT PROGRAMS AND A METHOD THEREFOR

[76] Inventors: Fumitaka Sato, 4-18-3, Imadera, Oome-shi, Tokyo; Kunihiro Nagura, 39-4-408, 1618-1, Ooazayamaguchi, Tokorozawa-shi, Saitama-ken, both of Japan

[21] Appl. No.: 810,884

[22] Filed: Dec. 18, 1985

Related U.S. Application Data

[63] Continuation of Ser. No. 422,953, Sep. 24, 1982, abandoned.

[30] Foreign Application Priority Data

Sep. 29, 1981 [JP] Japan .................... 56-153045

[51] Int. Cl.[4] ............................................. G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,581,291 | 5/1971 | Iwamoto et al. | 364/200 |
| 3,949,376 | 4/1976 | Ball et al. | 364/200 |
| 4,075,686 | 2/1978 | Calle et al. | 364/200 |
| 4,078,254 | 3/1978 | Beausoleil et al. | 364/900 |
| 4,095,269 | 6/1978 | Kawabe et al. | 364/200 |
| 4,126,894 | 11/1978 | Cronshaw et al. | 364/200 |
| 4,136,386 | 1/1979 | Annunziata et al. | 364/200 |
| 4,161,024 | 7/1979 | Joyce et al. | 364/200 |
| 4,181,937 | 1/1980 | Hattori et al. | 364/200 |
| 4,253,146 | 2/1981 | Bellamy et al. | 364/200 |
| 4,280,176 | 7/1981 | Tan | 364/200 |
| 4,450,524 | 5/1984 | Oberman | 364/200 |
| 4,463,420 | 7/1984 | Fletcher | 364/200 |
| 4,473,877 | 9/1984 | Tulk | 364/200 |
| 4,481,580 | 11/1984 | Martin et al. | 364/200 |
| 4,484,267 | 11/1984 | Fletcher | 364/200 |

*Primary Examiner*—James D. Thomas
*Assistant Examiner*—William G. Niessen

[57] ABSTRACT

The invention provides a device and method for data processing. The data processing device has a local memory which has part of address locations of the main memory as its address location, which is accessed by a CPU, and which can obtain same effect as cache memory without having cache directory, a comparator which determines whether or not an address to be accessed is an address allocated in the local memory when the CPU requests memory access to the main memory, a flip-flop which indicates that the data processing device is in the initial program loading mode or the in-operation mode, and a memory control unit which controls to copy data stored in a specific part of address locations of the main memory into the local memory by reading out an instruction (loader) from the main memory when the flip-flop indicates the initial program loading mode, and which controls to write data in the main memory by reading out an instruction (if stored) from the local memory when the flip-flop indicates the in-operation mode. The method for processing data has the step of loading data from an external memory into the main memory at initial program loading, the step of copying part of data stored in the main memory to the local memory, and the step of reading out an instruction from the local memory and writing data in the main memory when the instruction to be read out in the in-operation mode is stored in the local memory, and reading out an instruction from the main memory and writing data in the main memory when the instruction is not stored in the local memory.

9 Claims, 4 Drawing Figures

DATA PROCESSING SYSTEM HAVING A LOCAL MEMORY WHICH DOES NOT USE A DIRECTORY DEVICE WITH DISTRIBUTED RESIDENT PROGRAMS AND A METHOD THEREFOR

This application is a continuation of application Ser. No. 422,953, filed Sept. 24, 1982, now abandoned.

BACKGROUND OF THE INVENTION

The present invention relates to a data processing device and a method therefor.

Data processing devices have been recently manufactured at low cost due to the development of LSIs (large scale integrated circuits) and microcomputers. Along with this development, a system is herein proposed in which a low-cost microprocessor is connected to a data processing device to perform systematic operations. Using an LSI or microprocessor for arithmetic control or input/output control, unique processing is performed in accordance with specific software.

FIG. 1 shows an example of a data processing device which adopts the above system. A central processing unit 11 (to be referred to as a CPU 11 hereinafter) controls arithmetic operations in accordance with a program stored in a main memory unit 12 (to be referred to as an MMU 12 hereinafter) and supervises I/O devices (not shown) connected to a common bus 15.

Input/output processors 13 and 14 (to be referred to as IOPs 13 and 14 hereinafter) perform data transfer between the common bus 15 and the I/O devices. The CPU 11, the MMU 12, and the IOPs 13 and 14 are connected to the common bus 15.

In the data processing device shown in FIG. 1, the I/O devices occupy the common bus 15 to transfer address data and to exchange information with each other therethrough.

General programs including an operating system (to be referred to as an OS hereinafter) are stored in the MMU 12. The CPU 11 accesses the MMU 12 via the common bus 15 every time OS control is required. At this time, the CPU 11 occupies the common bus 15 and transfers data in predetermined units. Thereafter, the common bus 15 is open to other devices.

However, in the system described above, the CPU 11 frequently occupies the common bus 15 since the OS is enlarged in scale. This further increases the OS overhead, thus degrading the system performance.

A cache memory system is used to perform high speed processing so as to improve the performance of the CPU 11. The cache memory is a high speed memory for temporarily storing data transferred between the CPU 11 and the MMU 12. Although the storage capacity of the cache memory is small, data is smoothly transferred between the CPU 11 and the MMU 12 since a high-speed memory element is used.

The MMU 12 and the cache memory are each generally subdivided into blocks having a fixed length (32-byte to 64-byte length). Data stored in the MMU 12 is transferred to the cache memory in units of blocks. If the CPU 11 requires both a calculation of the number of instructions and also the next instruction, it first checks to see whether or not such data is stored in the cache memory. If the necessary data is stored in the cache memory, it is immediately read out therefrom. This data is stored as an address table in a memory which is a so-called directory in order to perform high-speed addressing. However, if the necessary data is not stored in the cache memory, a block including this data is read out from the MMU 12 and is transferred to the cache memory. At the same time, the block described above is used for processing by the CPU 11. One block generally holds a number of data which is larger than the data processed by one instruction. Further, in operation, necessary data is more likely to be included in the same block of the MMU 12. Therefore, according to the system described above, the processing speed of the computer is increased.

When the cache memory system is adopted, the performance of the CPU 11 is improved. However, hardware (the directory and its peripheral circuits) for controlling the CPU 11 is large in size. Further, the control system of the CPU 11 becomes complex. Therefore, the above system is not an optimal one since highly integrated memory elements are available at low cost.

SUMMARY OF THE INVENTION

The present invention has been made to eliminate the above drawbacks and has the object of providing a device and method for data processing wherein a set of routines which are frequently used in an OS is stored in a local memory arranged in a CPU and having high-speed elements, and the CPU accesses the local memory, so that the operation efficiency of a bus and the speed of a CPU instruction cycle are greatly improved, and hence the performance of the bus is greatly improved.

In order to achieve the above object of the present invention, there is provided a data processing device, comprising:

a main memory (12);

a central processing unit (11), connected to said main memory (12), for accessing said main memory (12);

local memory means (22), connected to said central processing unit (11), defining part of an address location of said main memory (12) as an address thereof, and accessed in place of said main memory (12) by said central processing unit (11); and memory control means (23) for comparing a first address which indicates said part of said address location and a second address produced by said central processing unit (11) when said central processing unit (11) requests a memory access to said main memory (12), for determining whether or not said second address is within an address range allocated in said local memory means (22), and for supplying to said central processing unit (11) control data indicating whether said main memory (12) is to be accessed or said local memory means (22) is to be accessed.

According to the data processing device and the method therefor, the following effects are obtained:

(i) Since the local memory comprises a high speed memory, the cycle time of the CPU instruction is shorter than the access time to the main memory.

(ii) While the CPU accesses the local memory, other I/O devices can access the main memory.

(iii) The OS can be easily improved and modified, as compared with a system where the OS is programmed in a ROM in a firmware manner.

(iv) Since the content of the local memory can be dynamically changed, flexible applications can be provided in accordance with a change in the system.

BRIEF DESCRIPTION OF THE DRAWINGS

Other objects and features of the present invention will be apparent from the following description taken in connection with the accompanying drawings in which.

DETAILED DESCRIPTION OF THE PREFERRED EMBODIMENT

Figure 1:
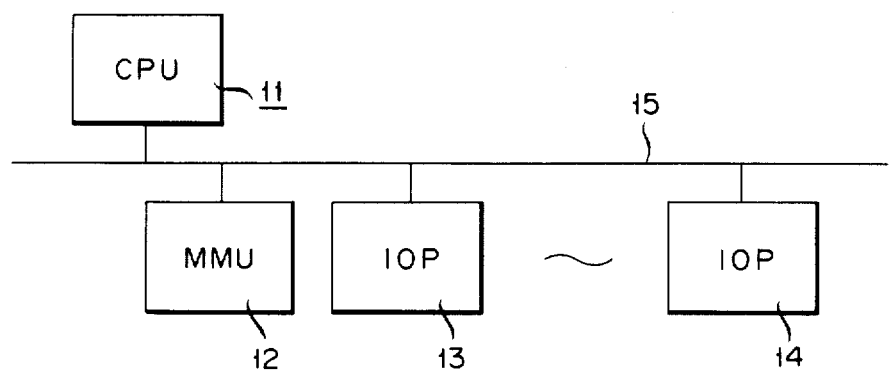
FIG. 1 is a block diagram showing the overall configuration of a conventional data processing device.
Figure 2:
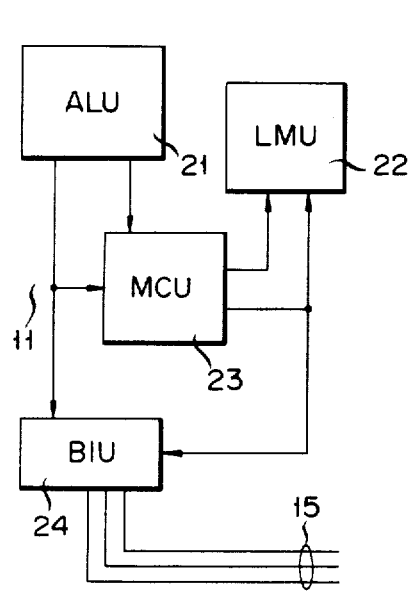
FIG. 2 is a schematic block diagram showing the configuration of a CPU to which the present invention is applied.
Figure 3:
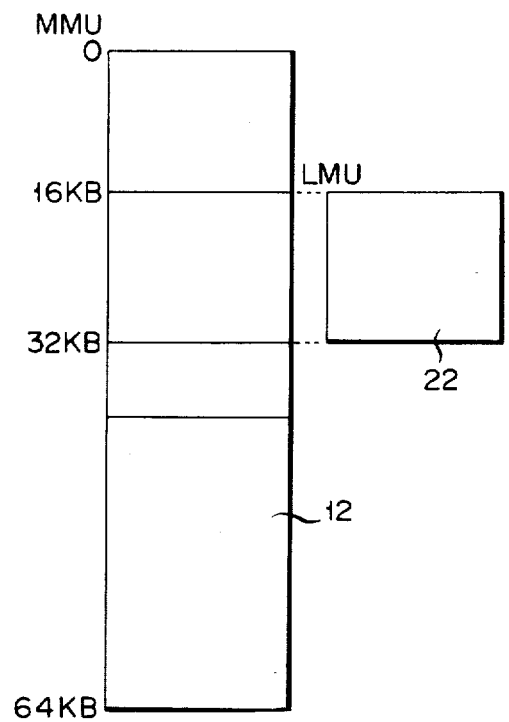
FIG. 3 shows memory maps of the main memory and the local memory which are used in the present invention.
Figure 4:
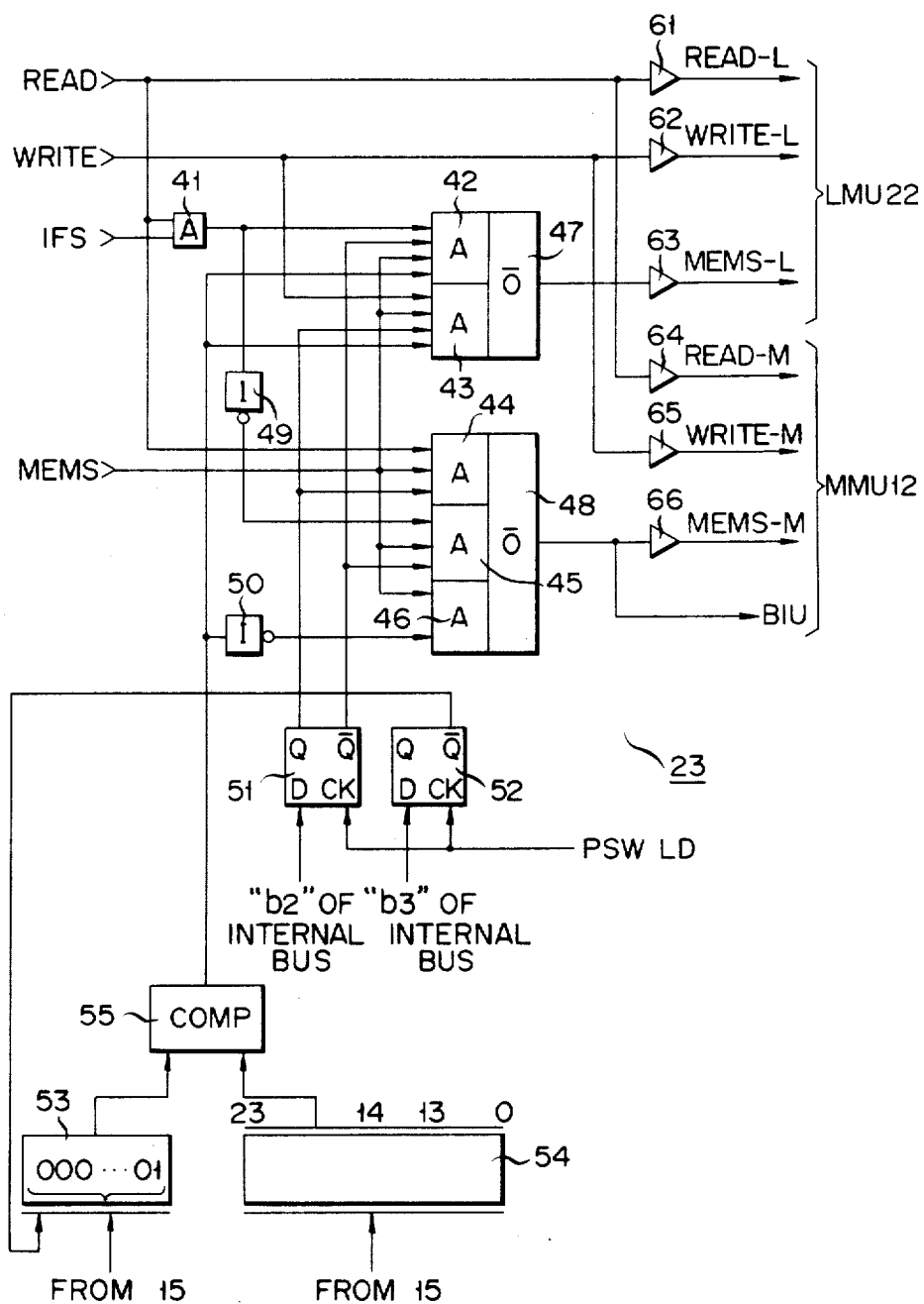
FIG. 4 is a block diagram showing the circuitry of the memory control unit shown in FIG. 2.

FIG. 2 is a schematic block diagram showing the configuration of a CPU to which the present invention is applied. Illustration is made only for parts which are related to the present invention. A CPU 11 comprises an arithmetic and logic unit 21 (to be referred to as an ALU 21 hereinafter), a local memory unit 22 (to be referred to as an LMU 22 hereinafter), a memory control unit 23 (to be referred to as an MCU 23 hereinafter), and a bus interface unit 24 (to be referred to as a BIU 24 hereinafter). The ALU 21 performs logical computation in accordance with program data stored in the LMU 22 or an MMU 12 and controls I/O devices connected to the system. The LMU 22 is an additional memory in accordance with the present invention. A set of program routines which are frequently used among an OS of the MMU 12 is stored in the LMU 22. In this embodiment, as shown in FIG. 3, the storage contents of the address location corresponding to the addresses from 16KB to 32KB can be copied and stored in the LMU 22. The MCU 23 is connected to the ALU 21 and the LMU 22, and the internal configuration thereof is shown in FIG. 4. The MCU 23 has an address register, a comparator, flip-flops, and various types of gates (not shown), and controls the memory units which are associated with the present invention.

The BIU 24 is an interface which is used to connect the CPU 11 to a common bus 15, and includes a bus driver/receiver (not shown) and other types of gates. The common bus 15 is constituted by a plurality of address lines, data lines and control lines, respectively.

In the data processing device with the above arrangement, the CPU 11 reads out part of the OS from the MMU 12 and writes it into the LMU 22. An address which indicates the correspondence between a program written in the LMU 22 and a memory area of the MMU 12 is set in an address register 53 in the MCU 23. Thereafter, the CPU 11 performs operations independently of the storage content of the LMU 22. Every time the CPU 11 accesses the MMU 12, an address produced by the CPU 11 is compared with the value set in the address register 53 by a comparator 55. If the address data produced by the CPU 11 is within the sum of the address data stored in the address register 53 and the capacity of the LMU 22, the CPU 11 accesses the local memory 22 At the same time, a signal output to the common bus 15 is prohibited by the BIU 24.

The configuration and the mode of operation of the data processing device according to the present invention will be described in detail. When the system is initialized (the initial program is loaded), a loader is loaded to the MMU 12 from an external memory such as a disc unit which is connected to IOPs 13 and 14. By this loader, data (e.g., operating system program and user's program) is loaded from the magnetic disc unit into the MMU 12. Part or all of the data stored in the MMU 12 is also loaded into the LMU 22. At this time, part of each address location assigned to the memory area of the MMU 12 is also assigned as an address of the LMU 22. The write and read instructions are commonly used in both the MMU 12 and the LMU 22. In this case, the CPU 11 must select either one of the MMU 12 and the LMU 22, which have the same addresses. Further, when copying a program which has a data area in the LMU 22 and when executing this program, partial trouble occurs since data must be read out from this data area by other devices such as I/O devices. Therefore, in this case, data must be written in the data area of the MMU 12.

In order to solve this problem according to the present invention, a flip-flop is arranged to distinguish the initial-operation duration from the in-operation duration. When the system is initialized, an instruction word of the loader is read out from the MMU 12, and data (e.g., user's program) stored in the MMU 12 is copied into the LMU 22.

However, when the system is operated, an instruction word of the user's program is read out from the LMU 22, and data (operation result by execution of the user's program) is read out from and written in the MMU 12.

FIG. 4 shows a circuit for controlling the operation described above. The circuit is part of the MCU 23. The MCU 23 has a controller which produces a memory start signal MEMS after producing a read signal READ and a write signal WRITE so as to perform a predetermined operation. Such a controller is known to those skilled in the art, and a detailed description thereof will be omitted. The read signal READ is supplied to one input terminal of an AND gate 41 and the first input terminal of an AND gate 44. The read signal READ is also supplied to the LMU 22 through a driver 61 and to the MMU 12 through a driver 64. An instruction fetch cycle signal IFS (which indicates whether or not the CPU 11 is in a step to fetch an instruction) is supplied to the other input terminal of the AND gate 41. The write signal WRITE is supplied to the first input terminal of an AND gate 43. The write signal WRITE is also supplied to the LMU 22 through a driver 62 and to the MMU 12 through a driver 65.

The memory start signal MEMS is commonly supplied to the second input terminal of each of the AND gates 43, 44 and 45, to the third input terminal of the AND gate 42 and to the first input terminal of an AND gate 46. Further, an output from the AND gate 41 is supplied to the first input terminal of the AND gate 42 and to the first input terminal of the AND gate 45 through an inverter 49.

An input terminal D of a flip-flop 51 receives data of the 2nd bit of the internal bus which is arranged in the ALU 21. An input terminal D of a flip-flop 52 receives data of the 3rd bit of the internal bus which is arranged in the ALU 21. A PSW updating control signal PSW LD is supplied to input terminals CK of the flip-flops 51 and 52, respectively. When the PSW updating instruction is issued, the flip-flops 51 and 52 are set. An output from an output terminal Q of the flip-flop 51 is supplied to the third input terminals of the AND gates 43 and 44, respectively. An output from an output terminal $\overline{Q}$ is supplied to the second input terminal of the AND gate 42 and to the third input terminal of the AND gate 45.

An output from an output terminal $\bar{Q}$ of the flip-flop 52 is supplied as the most significant bit data of an address register 53. Start address data of the LMU 22 is stored in the address register 53. The address data produced by the CPU 11 is stored in the address register 54. Data stored in the address registers 53 and 54 is supplied to the comparator 55. The comparator 55 compares upper 10-bit data (data above the 14-th bit, that is, above 16KB-th address, in this embodiment) with the address data stored in the address register 53 so as to determine whether or not the address to be accessed is within the sum of the address data stored in the address register 53 and the storage capacity of the LMU 22. An output from the comparator 55 is supplied to the fourth input terminals of the AND gates 42 and 43 and to the second input terminal of the AND gate 46 through an inverter 50.

Outputs from the AND gates 42 and 43 are supplied to an OR gate 47. An output from the OR gate 47 is supplied to the LMU 22 through a driver 63 as the memory start signal MEMS-L. Outputs from the AND gates 44, 45 and 46 are supplied to an OR gate 48. An output from the OR gate 48 is supplied to the BIU 24. The output from the OR gate 48 is also supplied to the MMU 12 through a driver 66 as the memory start signal MEMS-M.

The mode of operation of the circuit shown in FIG. 4 will be described in detail.

When the system is initialized, assume that the flip-flop 51 is set and the output from the comparator 55 is high. In this case, the address data stored in the address register 54 corresponds to an address from 16KB to 32KB of the MMU 12. When the read signal READ is produced by the CPU 11 and then the memory start signal MEMS is produced therefrom after a short period of time, only the AND gate 44 is ON. Then, the memory start signal MEMS-M is supplied to the MMU 12 through the OR gate 48 and the driver 66. At the same time, a signal which allows access to the BIU 24 is produced. As a result, a desired data string is read out from the MMU 12 through the common bus 15.

Assume that the write signal WRITE is produced by the CPU 11 in the same state. Only the AND gate 43 is ON, and the memory start signal MEMS-L is supplied to the LMU 22 through the OR gate 47 and the driver 63. As a result, data read out from the MMU 12 is written in the LMU 22.

However, when the system is operated, the flip-flop 51 is reset. Now assume that the output from the comparator 55 is high (memory address range: 16KB to 32KB) and that the read signal READ of the instruction word is produced by the CPU 11. When the CPU 11 produces the IFS signal of high level, the AND gate 41 is ON. When a short period of time has elapsed, the memory start signal MEMS is supplied from the CPU 11 to the AND gate 42 which is then turned on. Therefore, the memory start signal MEMS-L is supplied to the LMU 22 through the OR gate 47 and the driver 63. Since the read instruction READ-L is supplied to the LMU 22 via the driver 61, an instruction word is read out from the LMU 22 which is operated at high speed.

In this state, assume that the read signal READ or the write signal WRITE is produced by the CPU 11 and then the memory start signal MEMS is produced thereby. The AND gate 45 is ON (the AND gate 45 is ON except for the case where the IFS signal and the READ signal are supplied). The memory start signal MEMS-M is supplied to the MMU 12 through the OR gate 48 and the driver 66. At the same time, a bus enabling signal of the common bus 15 is supplied to the BIU 24. Since the MMU 12 has already received the read instruction READ-M or the write instruction WRITE-M through the driver 64 or 65 respectively, desired data can be fetched in the CPU 11 through the common bus 15.

The value of the read/write signal READ/WRITE must be determined in the LMU 22 and the MMU 12 sufficiently prior to the output of the memory start signal (MEMS-L/MEMS-M). The timing between the memory start signal and the read/write signal is guaranteed even if the circuit shown in FIG. 4 is added. This is because the duration in which the read/write signal passes the circuit shown in FIG. 4 is shorter than that in which the memory start signal passes therethrough.

When the output from the comparator 55 becomes low, a signal of high level is supplied to the AND gate 46 through the inverter 50, so that the memory start signal MEMS is supplied to the MMU 12 through the AND gate 46 and the OR gate 48.

The flip-flop 52 is reset to disable the LMU 22. An output from the output terminal $\bar{Q}$ of the flip-flop 52 is supplied as the most significant bit of the address register 53, so that the most significant bit is set to logic level "1". As a result, a very large value is set in the address register 53. The output from the comparator 55 becomes low, and the memory start signal may not be supplied to the LMU 22.

Since the flip-flop 51 is set by the PSW updating instruction which is issued in the master mode, the value may not be modified by the user's program. The address register 53 may comprise a hard-wired constant circuit.

The user's program need not be stored in a range of 16KB to 32KB. Even if it overflows, the overflowed program portion may be read out from the MMU 12, while the program portion in the range of 16KB to 32KB is read out from the LMU 22. Thus, the user's program area may not be limited.

In the above embodiment, the LMU 22 comprises eight chips of memory elements each of which consists of 8 bits×2KB. However, a memory element of 8 bits×8KB is being developed. If this memory element is used, only two chips are required to form the LMU 22. Therefore, the data processing device which has the local memory of the present invention has a greater advantage than the data processing device which adopts the cache memory which requires a large peripheral circuit and a directory memory.

What we claim is:

1. A data processing system comprising:
    (a) a main memory having a first plurality of addressable memory locations;
    (b) a central processing unit coupled with said main memory including means for producing a current address and, selectively, an access command to said main memory or a local memory using said current address;
    (c) a local memory, coupled with said central processing unit, including:
        (i) a second plurality of addressable memory locations having the same addresses as a fixed subset of said first plurality of addressable memory locations; and
        (ii) means for addressing said second plurality in place of said main memory without use of a directory, using said same addresses and said access command;

so that data from said main memory is not rolled in and out of said local memory;

(d) memory control means for receiving said access command from said central processing unit and providing memory control outputs to said main memory and local memory including:

(i) means for comparing the address of said subset with said current address, which provides an output indicating whether said current address corresponds to a location within said subset; and (ii) means, coupled with said output of said means for comparing, for selectively supplying to said main memory and said local memory at least one control signal indicating which of said main memory and said local memory is to be accessed.

2. A system according to claim 1, wherein said subset of said first addressable memory locations is contiguous and has a start address and a length and wherein said means for comparing compares said start address and said length with said current address.

3. A system according to claim 2, wherein said memory control means comprises a comparator, for comparing said start address and said length with said current address, and a flip-flop for indicating a load status of said local memory so that:

(i) when said flip-flop is kept at a first logic level indicating not to load and when said output of said comparator indicates that said current address corresponds to a location within said contiguous subset, said control signal is supplied so as to cause a:

(1) write to said main memory if said access is a write command; and (2) read from said local memory if said access is a read command;

(ii) when said flip-flop is kept at a second logic level indicating to load and when said comparator determines that said current address corresponds to a location within said contiguous subset, said control signal is supplied so as to cause a:

(1) read from said main memory if said access is a read command; and (2) write to said local memory if said access is a write command.

4. A data processing system, comprising:

(a) a main memory having a first plurality of addressable memory locations; and (b) a central processing unit coupled with said main memory through a common bus, including:

(i) an arithmetic and logic unit including means for producing a current address and, selectively, an access command to said main memory or a local memory using said current address;

(ii) a local memory coupled with said arithmetic and logic unit, having a second plurality of addressable memory locations having the same addresses as a fixed contiguous subset of said first plurality of addressable memory locations, and addressable, in place of said main memory without use of a directory, by said arithmetic and logic unit using said same addresses and said access command, so that data from said main memory is not rolled in and out of said local memory;

(iii) a flip-flop, coupled with said arithmetic and logic unit and with said local memory, which indicates a load status of said local memory;

(iv) means for setting and storing a start address, which is the same as a first address of a start location within said contiguous subset, and a length of said local memory, such that said start address and said length are unmodifiable when said flip-flop is at a first logic level indicating not to load;

(v) a comparator, coupled with said means for setting and storing, for comparing said start address and said length with said current address, which provides an output indicating whether said current address corresponds to a location within said contiguous subset;

(vi) memory control means, coupled with said output of said comparator, and said flip-flop, which produces a bus disable signal, for supplying at least one control signal, selectively, to said main memory or said local memory so that:

(1) when said flip-flop is kept at a second logic level indicating to load and when said output of said comparator indicates that said current address corresponds to a location within said contiguous subset, said control signal is supplied so as to cause a:

(A) read from said main memory if said access is a read command; and (B) write to said local memory if said access is a write command; and (2) when said flip-flop is kept at the first logic level and when said output of said comparator indicates that said current address corresponds to a location within said contiguous subset, said control signal is supplied so as to cause a:

(A) write to said main memory if said access is a write command; and (B) read from said local memory if said access is a read command; and (vii) a bus interface unit, coupled with said memory control means, for prohibiting use of said common bus in accordance with said bus disable signal.

5. A system according to claim 3 or 4 further comprising means coupled with said local memory for disabling said local memory whereby all memory accesses corresponding to said contiguous subset may be directed to said main memory.

6. A system according to claim 5, wherein said means for disabling further comprises:

(I) a flip-flop for specifying a bit of said start address; and (II) a register, coupled with said flip-flop for specifying, which stores said start address, so that said start address may be modified to correspond to an addressable memory location outside said contiguous subset.

7. A method for using a local memory, in a data processing system having a central processing unit, a main memory, and an external memory, comprising the steps of:

(a) loading program data and instructions from said external memory into a first plurality of addressable memory locations in said main memory, at initial program load;

(b) reading out of said main memory a part of said data from a fixed subset of said first plurality into said local memory, said local memory having a second plurality of addressable memory locations having the same addresses as said subset said part being that part which is found in said subset;

(c) addressing said local memory in place of said main memory without use of a directory, using said same addresses and said access command, so that data from said main memory is not rolled in and out of said local memory;

(d) accessing said main memory for locations of said first plurality which are not part of said subset; and (e) executing a user program, whereby a read from said subset accesses said local memory, and a read from said main memory outside of said subset accesses said main memory.

8. A method for using a local memory, according to claim 7, wherein said subset of said first set of addressable memory locations is contiguous.

9. A method for using a local memory in a data processing system having a central processing unit, a main memory, and an external memory, comprising the steps of:

(a) loading program data and instructions from said external memory into a first plurality of addressable memory locations in said main memory at initial program load;

(b) loading a second plurality of addressable memory locations in said local memory having the same addresses as a fixed contiguous subset of the first plurality and directly addressable using said same addresses including the steps of:
  (i) setting a flip-flop, which indicates a load status of said local memory, to a first state, indicating to load;
  (ii) reading out of said main memory a part of the data loaded in step (a) said part being that part which is found in said contiguous subset;
  (iii) writing said part into said local memory; and (c) using said local memory including the steps of:
  (i) setting said flip-flop to a second state indicating not to load;
  (ii) reading from said local memory for addresses of said contiguous subset; and
  (iii) reading from said main memory for addresses of said first plurality outside said contiguous subset.

* * * * *

UNITED STATES PATENT AND TRADEMARK OFFICE
CERTIFICATE OF CORRECTION

PATENT NO. : 4,628,450

DATED : December 9, 1986

INVENTOR(S) : F. SATO, et al.

It is certified that error appears in the above-identified patent and that said Letters Patent is hereby corrected as shown below:

Title Page, please add name of Assignee,

--TOKYO SHIBAURA DENKI KABUSHIKI KAISHA--.

Title Page, please add name of law firm,

--KENYON & KENYON--.

Signed and Sealed this

Sixth Day of October, 1987

Attest:

DONALD J. QUIGG

Attesting Officer

Commissioner of Patents and Trademarks